INVENTOR.
JAMES D. QUINN
BY Harry J. McCauley
ATTORNEY

United States Patent Office 3,059,238
Patented Oct. 16, 1962

3,059,238
EQUIPMENT PERFORMANCE RECORDER
James D. Quinn, Warwick, Md., assignor to E. I. du Pont de Nemours and Company, Wilmington, Del., a corporation of Delaware
Filed Feb. 25, 1960, Ser. No. 11,104
3 Claims. (Cl. 346—34)

This invention relates to an equipment performance recorder, and particularly to an improved equipment performance recorder of the type disclosed in U.S. Patent 2,925,308, property of the same assignee.

The increasing complexity of manufacturing operations has made it desirable to monitor the performance of individual machines, either continuously or intermittently, to obtain some index of their reliability both as regards continuity of operation and also durations of, and reasons for, downtime. Preferably, the record obtained should be compact and of a nature amenable to processing in conventional modern office computing machines, so that the information gained can be conveniently added to the general store which management must utilize in order to conduct the manufacturing efficiently.

Figure 1:
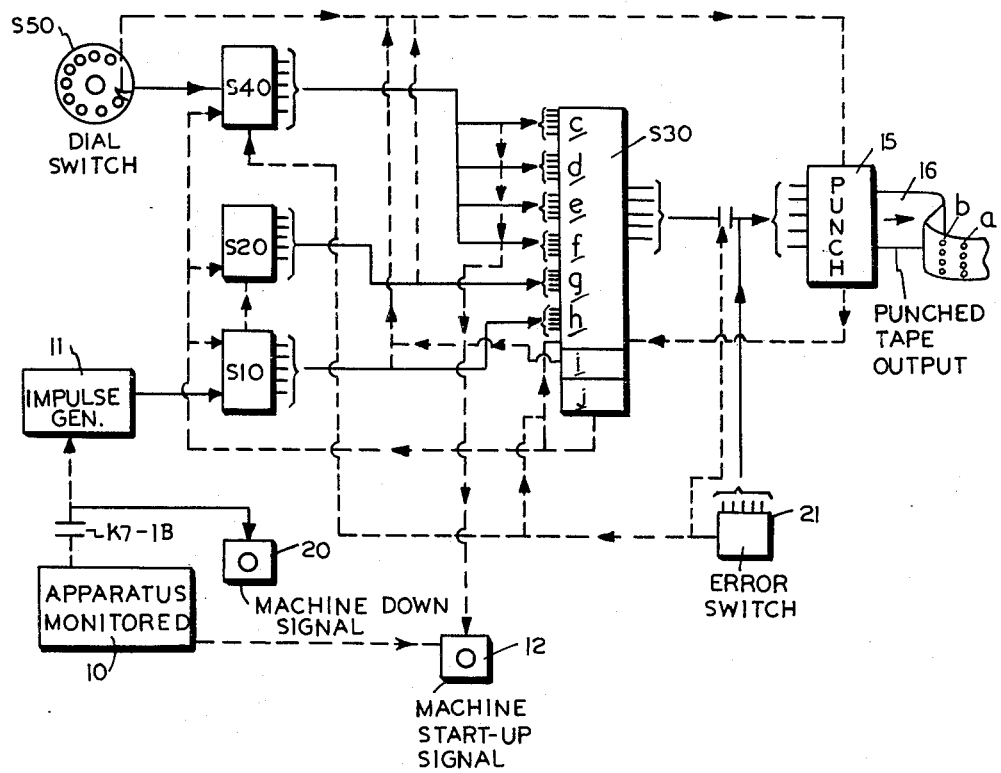
Figure 2A:
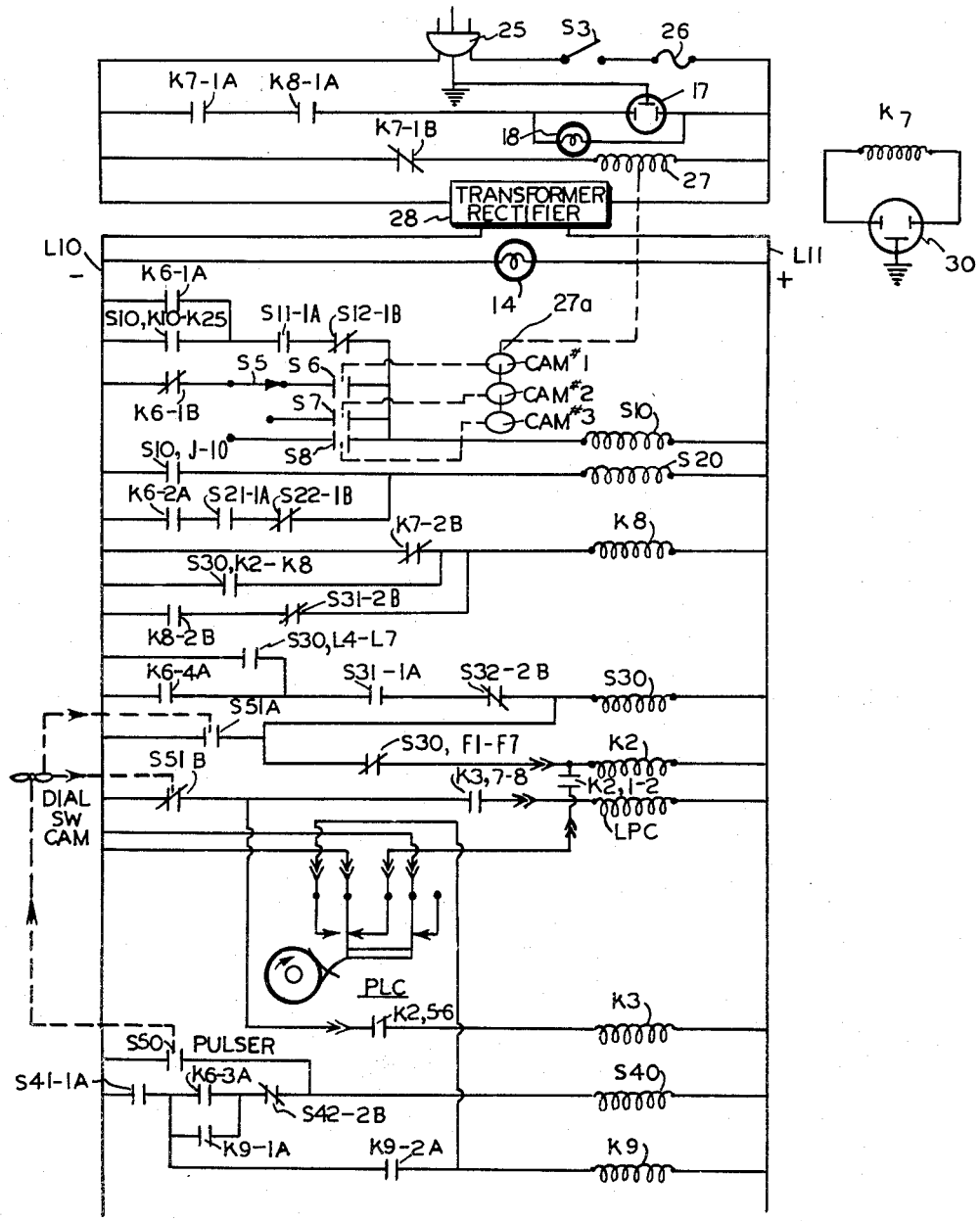
Figure 2B:
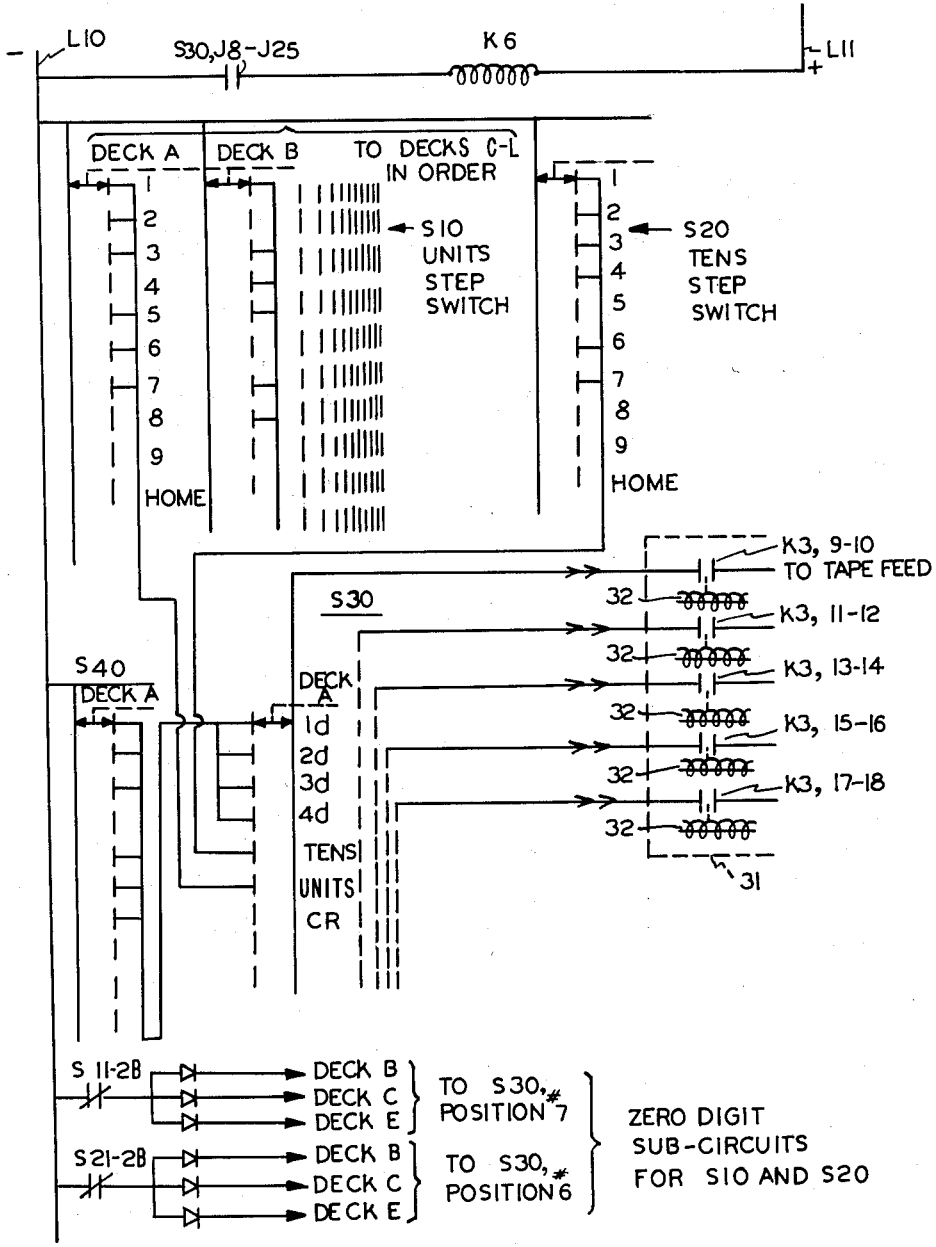

An object of this invention is to provide an equipment performance recorder which is adapted to record apparatus performance information in a form acceptable to conventional data processing apparatus. Another object of this invention is to provide an equipment performance recorder which is relatively light in weight and, thus, portable, so that it can be conveniently moved from one machine location to another in order to monitor different machines intermittently. Other objects of this invention include the provision of an equipment performance recorder which is relatively low in first cost and maintenance, reliable in service, and so simple in operation that maintenance personnel require little or no extra training for effective utilization. The manner in which these and other objects of this invention are achieved will become apparent from the detailed description and the drawings, in which:

FIG. 1 is a schematic functional diagram of a preferred embodiment of apparatus according to this invention wherein the flow of information relating to the manufacturing machinery monitored is indicated by solid lines while the application of control signals by one apparatus component to another, in order to achieve the necessary time sequence of operation, is indicated in broken line representation, and FIGS. 2A–2B are a diagrammatic electrical circuit diagram of the embodiment of FIG. 1.

Generally, the equipment performance recorder of this invention consists of the combination of a transducer signaling the occurrence of a shutdown of a powered or power-controlled equipment, an electrical pulse generator responsive to the transducer emitting electrical pulses at predetermined time intervals, a manually operated encoding electrical pulse transmitter, a plurality of n-step switching devices, each reserved to the reception of a particular kind of equipment performance information, a main programming director adapted to receive the several types of information temporarily stored within the several individual n-step switching devices and transmit this information, retained in segregated form, in a preselected time sequence, and recording means receiving the information from the programming director which imprints the record with the information, thereby completing the cycle.

Referring to FIG. 1, the apparatus monitored is indicated by block 10 and may be any powered or power-controlled apparatus. For purposes of explicit description, the usual case of electrically powered or electrically controlled equipment to be monitored is assumed; however, it will be understood that this invention is not limited to such equipment but may be employed with hydraulically, pneumatically, or optically powered or controlled devices as well as with many other types, so long as the proper transducer responsive to the equipment is employed. Thus, a suitable transducer for hydraulically or pneumatically powered or controlled equipment is a conventional pressure switch, and a wide variety of other transducers are available for monitoring other types of equipment. For the embodiment described, a normally open set of relay contacts K7—1B constitutes the operative mechanism of the transducer, which contacts are maintained open by a relay coil, not shown, connected in the power circuit of machine 10 so as to become de-energized upon the occurrence of a machine shutdown. Thus, when machine 10 is in operation, as evinced by power application to its own circuitry, relay contacts K7—1B are maintained open, and the equipment performance recorder hereinafter described remains in inactive state, but in standby readiness for action whenever a shutdown of 10 should occur.

At the outset, a generalized statement of the information which it is desirable to obtain and process is helpful to an understanding of the invention. The following description treats of this information in the approximate time order of its accumulation and processing. The most important fact is the duration of the downtime which machine 10 undergoes in any specific instance, and provision is made for the measurement of this downtime by an impulse generator 11 which is adapted to emit electrical pulses at predetermined time intervals and pass this information to units counter S10, the first of the four n-step switching devices employed in the described embodiment, as indicated by the solid line drawn between 11 and S10, with arrowhead directed towards the latter to indicate the direction of information flow.

In the situation where the range of time interest is, for example, 99 minutes, units counter S10 is employed to measure individual minute intervals up to and including nine in number, after which it is adapted to step a tens counter, S20, one contact for each cycle of S10, whereupon the total duration of shutdown will, of course, be the sum of the minutes tolled by S20 and S10. The control function of S10 upon S20 is indicated by the broken line drawn therebetween in FIG. 1 and the arrowhead directed towards S20, which denotes that the latter is the controlled component of the pair. It will be understood that the downtime duration information is stored within S10 and S20 during the entire period of the downtime and for some time thereafter, within, of course, the ranges of these counters. However, the encoding operation next described precedes any further processing of S10, S20 data, which latter automatically accumulate and furnish a measurement of the downtime up to any given instant in time during which machine 10 is shut down.

If it is now assumed that repairs have been made to the apparatus monitored, 10, restoration of the equipment to service is indicated by the signal trace running from 10 and terminating at block 12, which is the machine startup signal adapted to advise the attending personnel, such as the repair or serviceman, that the equipment is once again in operation and that it is necessary for the attendant to register certain supplementary data. Such data typically includes the identity of the machine 10, the cause for the shutdown as determined by the attendant, and perhaps other information, depending upon the particular requirements. It is especially convenient to employ a numerical code for this purpose, and such a code is settled upon in advance and adhered to rigorously by all concerned. A 5-channel Baudot code has a completely adequate range for the purposes contemplated, and a dial switch S50, such as those employed in automatic telephone service, is provided so that the attendant can manually encode, as separate manipulations of the dial, the identity of the machine involved, the nature of the shutdown currently suffered and any other information it is desirable to record concerning the incident.

An *n*-step switching device S40, hereinafter referred to as the encoding switch, is provided to receive the information from each dialing operation in sequence and, immediately upon the accumulation of these separate bits of information, transmit them through separate 5-channel sub-circuits in yet another *n*-step switching device, S30, the program director, directly to the 5-channel motorized punch 15. As indicated by the broken line trace, return of the dial of S50 to home position transmits a signal to punch 15, which actuates the punch through one punching step of operation, during which the five punch heads (not detailed) individually either cut a hole through tape 16 or abstain from cutting such a hole, all in accordance with the code adhered to, thereby producing a succession of 5-channel information recordings such as *a* and *b*, shown in vertical array in FIG. 1, as the tape is indexed through punch 15 in the direction indicated by the arrow drawn thereon. Punch 15 is constructed so as to, in effect, transmit an enabling signal to S30, indicated by the broken line trace leaving the lower end of 15, which permits indexing of the ganged switch thereof in sequence from the upper sub-circuit through positions *c*, *d*, *e*, and *f* in seriatim to receive the remaining dialed digits, four in number in this instance, completing the manual encoding.

At the conclusion of the dialing step, the next indexing to occur with the co-operation of punch 15 is the shifting of the ganged switch of S30 to connect sub-circuit *g*, at which point the accumulated tens duration of shutdown is automatically transmitted through S30 to 15, causing the punch to register a fifth recording in the sequence for that particular cycle on tape 16. The next-following indexing step of S30 establishes the circuit from S10 through the *h* sub-circuit of S30 to punch 15 which imprints the sixth recording on tape 16, namely, the units' number of minutes of the duration of shutdown, up to nine in number. The fact that the fifth and sixth recordings cause punch 15 to index tape 16 a single interval thereafter following each is indicated by the broken line traces running from the solid informational flow lines connecting S10 and S30 on the one hand and S20 and S30 on the other to punch 15. It is convenient to conclude the cycle corresponding to one transaction, i.e., a single particular machine shutdown, by two additional steps. The first of these is a "carriage return," indicated by *i* in the block representing S30, which is the next position the ganged switch of S30 is indexed to after its sixth punching operation. This "carriage return" causes punch 15 to punch tape 16 with a unique character for the future purpose of providing information that the transaction is closed when it is thereafter desired to transfer data from tape to card or to other media. Position *i* actuates punch 15, as indicated by the broken line trace therebetween (merging with that from S10) to index the ganged switch of S30 to the terminal position *j*, thus sending out homing signals to all four of the *n*-step switching devices S10, S20, S30, and S40, restoring all of these devices to their initial zero positions, at which time the recorder is ready for another complete cycle whenever called upon.

It is preferred to incorporate the auxiliary refinements consisting of a machine down signal 20, which may be simply a lamp actuated in response to the closing of contacts K7—1B, thus insuring against overlooking a machine which has suffered a breakdown, and an error switch 21, permitting manual over-riding of the recording cycle. Error switch 21 permits the attendant to halt the recording cycle up to, and including, position *f* of S30 if he perceives that he has erred in dialing S50, or for any other reason, simply by momentarily depressing the switch button 21. Punch 15 thereupon receives the character-istic error information, as indicated by the solid line trace connecting 21 with 15, and imprints a coded error recording on tape 16, after which punch 15 homes to its initial position at the start of its own cycle. Simultaneously, switch 21 restores S30 and S40 to home; however, it leaves S10 and S20 unaffected, so that any accumulated downtime registered therein is not lost and will accordingly be recorded in due course after the repeated, correct, dialing. In the event that S30 has already stepped past position *f*, error switch 21 is ineffective to terminate the full recording cycle, which will then go to completion and produce a seven item printed record regardless of the accuracy involved. If desired, the recorder code may include a unique number combination to record the fact that the immediately preceding recording was in error, in which case the data processing equipment employed to process tape 16 when it is to be evaluated will have to be programmed to evaluate the error information imprinted on the tape in the same manner as other specific information is handled.

A preferred embodiment of the invention without, however, an error switch auxiliary is shown somewhat schematically, in FIGS. 2A and 2B, the latter of which is in effect, an extension of the former, with leads L10 and L11 being identical circuit conductors.

Operating power for the circuit is drawn from plug 25 adapted to connect with the usual 110–120 v., 60 c., A.-C. mains. A protective fuse 26 is interposed after the main power switch S3 of the apparatus and there are three parallel-connected branches below the switch, the first of which contains, in parallel circuit connection, the external alarm plug-in 17 and alarm lamp 18 hereinafter described, the second the timer motor 27 and the third, a transformer-rectifier 28, which is the power source for the entire succeeding circuitry. Commercially available apparatus is employed where possible, and the timer 27, inclusive of the three-cam combination 27*a* which it drives, as indicated schematically by the broken line connection drawn therebetween, can be a Cramer Controls Corp. Type 511. Cam No. 1 of this timer is adapted to give a pulse at intervals of one minute by closure of S6, cam No. 2 a pulse at intervals of five minutes by closure of S7 and cam No. 3 a pulse at intervals of fifteen minutes by closure of S8. Transformer-rectifier 28 can conveniently be an Automatic Electric Corp. dry disc type, Catalog No. PA61 of 48 v. output. Indicator lamp 14 is the usual "power-on" indicator for the entire circuit.

Relay contacts are designated throughout by appropriate coil designation first, such as K7, for example, followed by a serial designation of the particular pair involved, if the relay possesses more than one pair of contacts. Numerous interlocking relay contacts are distributed throughout the several parallel branches of the complete circuit as shown in FIGS. 2A and 2B, and a detailed recitation of their respective locations is omitted from this description in the interest of brevity, since the fact of existence and the functioning alike are both brought out most conveniently in the description of operation.

The apparatus incorporates a signal input relay K7, shown in the inset, FIG. 2A, which is preferably operated by 110 v. current and is connected to the power circuit of the apparatus which it is desired to monitor through plug 30. Relays K2 and K3 are physically located in the punch assembly 31, FIG. 2B; however, it is convenient to show them in FIG. 2A adjacent the several contact pairs they operate. The punch latch contact sub-assembly designated PLC, FIG. 2A, is similarly integral with punch 31. Punch 31, in the specific apparatus described, was a Commercial Controls Corp. 8-channel, Model 2, provided with motorized tape feed.

Nested arrow connections are employed throughout the drawings to indicate plug-in points by which the several sub-assemblies can be connected into the complete circuit.

The apparatus is provided with four stepping switches which, in the detailed design, are all automatic Electric Sales Corp. Type 45, each provided with twelve decks of twenty-five individual contacts each. For simplicity in the showing, the twelve decks are detailed only for S10, and then only schematically as individual arrays of contacts, and all internal contact-to-contact circuitry is omitted completely. However, it will be understood that, in accordance with the practice of the art, the contacts of each of the first five decks A–E are connected (or not connected, as the case may be) one to another to provide unique electrical circuits corresponding to each position occupied by the stepping switch arm in the course of its vertical sweep, so that the five punches disposed in punch 31 are actuated in unique positional order and number to punch the recording tape to give, in the code preselected, a record corresponding to the information set up in the several stepping switches of the apparatus. As shown on FIG. 2B, these are: S10, the units counter; S20, the tens counter; S40, the encoding switch; and S30, the program director. Finally, a dial switch S50 (FIG. 2A) is provided, which can typically be an Automatic Electric Corp. Type 51 (10 pulse/sec.) embodying cam-operated associated contact pairs S51A and S51B, one of which is always open at all times when the other is closed.

The operation of the apparatus is as follows, it being assumed that main power switch S3 is closed, and that relay K7 has become de-energized by cessation of power supply to the equipment which is being monitored. Under these circumstances the relay contacts are at the beginning of the cycle of operation in the positions shown in FIGS. 2A and 2B, contacts K7—1B being closed, whereupon timer motor 27 goes into operation and rotates its cam shaft, so that one of the three available timed pulses, i.e., one minute, five minutes, or fifteen minutes, preselected by appropriate manual positioning of S5, is passed in continuous sequence to the coil S10 (FIG. 2A) of units counting stepping switch S10 (FIG. 2B). Each pulse steps switch S10 one position downward and, since the switch elements of all twelve decks are ganged together, the switch indexes over an available number of up to twenty-four positions throughout the full range before its fully capacity is exceeded. As indicated here, however, only nine positions of each of the decade counters S10 and S20 need be employed in this instance, with the tenth, designated "Home," being reserved for restoration of the switches to initial setting once the period of ten units reserved is tolled out. With S5 connected in series with the S6 contacts, one common setting for my apparatus, S10 steps one position for each minute of elapsed downtime up to a total of nine minutes.

At this time K8 is energized, because contacts K7—2B in series therewith are closed upon de-energization of K7. K8 then closes K8—2B, its parallel-connected holding contacts. S31—2B, a pair of contacts operated by program director S30 remaining closed during the time S30 is in de-energized condition at home position, K8 continues in the energized condition. K8 closes contacts K8—1A in series with alarm lamp 18 and the external alarm plug-in 17 to prepare them for operation upon eventual closure of contacts K7—1A, when relay K7 again becomes energized by start-up of the equipment monitored at the instant of its restoration to operation. It might be mentioned that alarm lamp 18 is adapted to provide a local signal to equipment-attending personnel, whereas a remotely located signal can optionally be simultaneously accommodated through an electrical cable plugged into 17.

The tenth position of S10 is provided with a unique contact, J10 in this instance (i.e., deck J, position 10) which causes coil S10 to close contacts S10, J10, FIG. 2A, thereby energizing the coil S20 of tens counter stepping switch S20. As is the customary technique when less than the full number of stepping positions is utilized, the remaining contacts No. 10–25 are all wired together, so that, at deck K, a circuit is completed closing stepping switch contacts S10, K10–25. This returns S10 to its initial home position because of the peculiar construction of the stepping switch, which incorporates in its construction a homing circuit consisting of a cam-operated "off-normal" set of contacts S11—1A, which remain closed at all times except when S10 is in home position, and a set of normally closed stepper contacts, S12—1B, which shunt out the impulse timer upon attainment of the last position utilized for meaningful stepping. This causes S10 to very rapidly step through to home (i.e., "zero" position), whereupon further down-time is measured by the step-by-step repetition of the cycle hereinbefore described.

As the down-time continues to run, it will be understood that S10 continues to measure the duration in units (preselected to be one, five or fifteen minute increments as hereinbefore described), whereas S20 continues to measure the duration in tens. The sum of these two measurements is, therefore, the total duration of the down-time and is one item of information which is later impressed on the recording tape by operation of punch 31 as hereinafter described.

It is often desirable to provide positive zero digit information, particularly if it later becomes necessary to transfer the information accumulated on a length of tape to punched cards, and this is accomplished by the individual three-diode circuits shown at the lower end of FIG 2B. It will be noted that these are connected directly to L10 through second sets of off-normal contacts S11—2B and S21—2B for S10 and S20, respectively, which are, however, designed in this instance to be closed only when the stepping switches are in home position, whereas they remain open at all other times. Unique electrical connections between decks B, C and E running to position No. 6 of program director S30, for S20, and to position No. 7 for S10, effect positive recordation of zero digits in conjunction with either units' time accumulation or tens' time accumulation whenever zero is effectively passed through in the course of time measurement.

If it is now assumed that the equipment monitored has been reactivated, K7 immediately becomes energized, thereby closing contacts K7—1A and, contacts K8—1A remaining closed (because K8 is still held in by its holding contacts K8—2B), a signal is given to the attending personnel by the illumination of alarm lamp 18 that it is now necessary to encode the other information which is required, i.e., the identity of the equipment which has failed, or the other fault responsible for the down-time, and, also, the specific reason for the monitored equipment shutdown. This can conveniently be done by the use of four digits, which are selected in accordance with the code settled on, by operation of the conventional telephone-type pulser dial S50. Concurrently, with the closure of contacts K7—1A, contacts K7—1B are opened by K7, thereby immediately halting operation of motor timer 27 and terminating the accumulation of further down-time.

Pulser dial S50 transmits a succession of electric pulses to the coil of S40 which, in number, correspond to the digits which are dialed. However, before describing the operation of stepping switch S40, the interrelationship of dial switch S50 to the rest of the circuitry will be described.

As will be understood by persons skilled in the art, S50 is provided with a cam, which is actuated responsive to all dial positions away from home to close the S51A contacts and simultaneously open the S51B contacts, FIG. 2A showing both contact pairs in the positions they occupy when S50 is standing idle at home position. The design is such that program director stepping switch S30 indexes its switching member during the de-energization which follows each re-opening of contacts S51A, thereby insuring that the digits which were individually immediately before inserted into stepping switch S40 are transferred with complete fidelity to stepping switch S30. Thus, as indicated in FIG. 2B, position No. 1 of S30 receives the first digit dialed in by the attending personnel, as represented by the abbreviation "1d" adjacent the first position contact, whereas positions No. 2, No. 3 and No. 4, respectively, receive the second, third and fourth digits (i.e., 2d, 3d and 4d) in sequence as they are individually dialed in.

PLC is the punch latch contact, which is on the same shaft as the punch cam. The punch shaft rotates continuously and, once each revolution, PLC mechanically releases a latch in the punch mechanism which, if one or more of the five punch coils 32 stand previously energized by information already passed on for recording, results in a single punching operation. PLC is required to go through a complete cycle of operation of reach punch actuation; however, its actuating cam is cut so that there is no operation of the PLC switch from the position shown in FIG. 2A until 70% of cam rotation has occurred. Accordingly, closure of the S51A contacts energizes K2 through normally closed S30, F1—F7. K2 remains held by its own contacts K2, 1—2 in closed circuit through switch PLC throughout the first 70% of the switch cam rotation. This closes contacts K2, 5—6, energizing K3, which, in turn, closes contacts K3, 7—8 and energizes LPC, the punch clutch magnet in punch 31 which actuates the clutch to effect the punching operation practically instantaneously. Energization of K3 also closes the five sets of contacts within punch 31 (FIG. 2B), i.e., K3, 9—10, K3, 11—12, K3, 13—14, K3, 15—16, and K3, 17—18 to energize the several punch coils as a necessary incident to the punching operation.

It is necessary that stepping switch S40 home after each digit is dialed into it, and this is effected by the operation of PLC which, towards the end of its cycle, closes the left-hand PLC switch contact and thereby briefly energizes K9 which closes its contact pair K9—1A. S41—1A and S42—2B are the off-normal and stepper contacts for S40 corresponding to their counterparts for S20 hereinbefore described and they, co-operatively with K9—1A, home stepping switch S40 at the conclusion of each individual dialing operation, so that S40 receives afresh each new digit transmitted to it.

After completing the dialing in of the four digits which designate machine identity and cause of breakdown, as a typical example of operation, although it will be understood that the circuit can be readily expanded to permit the recording of a great variety of additional data if desired, automatic insertion of the duration of shut-down information occurs. With the particular circuit herein described in detail this is accomplished by reservation of the L deck of S30 for the purpose, which closes S30, L4—L7 (FIG. 2A), thus energizing the S30 coil to thereby step stepping switch S30 one step. This immediately energizes K2 through the shunt connection with the S30 parallel branch which includes contacts S30, F1—F7 and K2 operates LPC one more cycle to punch in the accumulated tens time data from S20. Since S30, L4—L7 remains closed through additional points No. 6 and 7 stepping switch S30 steps to its point 6 and introduces the accumulated units time data from S10, again energizing K2 to cause LPC to punch the tape and thus record. S30 then steps to position No. 7, which is denoted in FIG. 2B "C.R.", the abbreviation for Carriage Return. This action operates LPC once more, this time to punch in a characteristic code signal advising that the transaction is completed. If later transfer of data from tape to punched cards is desired, the Carriage Return punch recording is useful to effect the feed of cards in sequence through the transfer apparatus.

Arrival of position 7 causes S30 to step one more, whereupon its switch arm moves to position No. 8, thus opening contact pair S30, L4—L7 to thereby de-energize S30, which completes the cycle to this point. It will be noted that there is a companion contact pair S30, K2—K8 in shunt power supply connection with K8, and closure of these contacts just prior to automatic insertion of the time duration data opens K8—1A in circuit with alarm lamp 18, to thereby turn it off, thus assuring the attending personnel that nothing more is required of them as regards dialing.

Arrival of the switch arm at S30, points No. 8—25, closes the appropriate circuit, reserved in this particular apparatus to deck J, thereby closing S30, J8—J25 (FIG. 2B) in series with K6, and this restores all of the stepping switches to home position. K6 is a slow release relay, which must be provided for the service it performs, due to the necessity to compensate for unequal homing times of the several stepping switches, since their switch arms can possibly occupy any position from No. 1 to No. 25 during operation of the apparatus. All K6 contacts (K6—1A, K6—1B for S10; K6—2A for S20; K6—4A for S30; and K6—3A for S40) are homing initiators which, in conjunction with the respective off-normal and stepper contacts pairs (S11—1A, S12—1B for S10; S21—1A, S22—1B for S20; S31—1A, S32—2B for S30; and S41—1A, S42—2B for S40), insure that all four stepping switches return to home even if a preceding homing operation (as in the case of S40, for example) has for any reason failed to occur.

This restores the apparatus to its original state in readiness for the next cycle of operation.

The apparatus described employed the 5-channel Baudot code, because this was of more than ample capacity for the information which had to be processed. Obviously, since an 8-channel punch was employed as standard equipment, it is possible to enlarge the recording capacity very greatly without much change in the circuitry. Also, there was nowhere near complete utilization of the unique circuit connection capacity afforded by the 25 point, 12 deck stepping switches employed in the described apparatus, which again affords a great potential enlargement of data handling capacity should this become necessary.

The program director in the detailed apparatus was a stepping switch; however, it is obvious that this is not essential and that other commercially available apparatus can be utilized in substitution. In addition, conventional solid state switching components such as transistors and the like, flip-flops or the equivalent can be utilized to effect a part or all of the switching operations required by this invention, and it is intended that the term "n-step switching device," as employed in the claims, covers all of these generically.

From the foregoing, it will be understood that this invention can be modified in numerous respects within the skill of the art without departure from the essential spirit, and it is intended to be limited only by the following claims.

What is claimed is :

1. A recording apparatus for monitoring the duration and cause of shutdown of powered or power-controlled equipment comprising in combination a transducer operated characteristically upon occurrence of said shutdown, an electrical pulse generator responsive to operation of said transducer emitting electrical pulses at predetermined time intervals, a first $n$-step switching device in circuit with said electrical pulse generator adapted to measure the duration of equipment shutdown as a count of said electrical pulses at said predetermined intervals, a manually operated encoding electrical pulse transmitter, a second $n$-step switching device in circuit with said manually operated electrical pulse transmitter for the reception of information introduced as the pulse output of said encoding electrical pulse transmitter, a program director responsive to said first and second $n$-step switching devices in sequence, and recording means responsive to said program director for imprinting a record with indicia representative of said duration of equipment downtime as well as of any said information introduced via said manually operated encoding electrical pulse transmitter.

2. A recording apparatus for monitoring the duration and cause of shutdown of powered or power-controlled equipment according to claim 1 wherein said program director is a stepping switch.

3. A recording apparatus for monitoring the duration and cause of shutdown of powered or power-controlled equipment comprising in combination a transducer operated characteristically upon occurrence of said shutdown, an electrical pulse generator responsive to operation of said transducer emitting electrical pulses at predetermined time intervals, a first $n$-step switching device in circuit with said electrical pulse generator adapted to measure the duration of equipment shutdown as a count of individual ones of said electrical pulses at said predetermined intervals, a second $n$-step switching device in circuit with said electrical pulse generator adapted to measure the duration of equipment shutdown as a count of a preselected multiple number of said electrical pulses at said predetermined intervals, a manually operated encoding electrical pulse transmitter, a third $n$-step switching device in circuit with said manually operated encoding electrical pulse transmitter for the reception of information introduced as the pulse output of said encoding electrical pulse transmitter, a fourth $n$-step switching device serving as a program director responsive to said first, second and third $n$-step switching devices in sequence, and recording means responsive to said fourth $n$-step switching device for imprinting a record with indicia representative of the total duration of said equipment shutdown as well as of any said information introduced via said manually operated encoding electrical pulse transmitter.

References Cited in the file of this patent

UNITED STATES PATENTS

| | | |
|---|---|---|
| 2,713,533 | Forrellad | July 19, 1955 |
| 2,776,867 | Boyan | Jan. 8, 1957 |

FOREIGN PATENTS

| | | |
|---|---|---|
| 758,196 | Great Britain | Oct. 3, 1956 |